(12) United States Patent
Vaidya et al.

(10) Patent No.: US 9,734,560 B2
(45) Date of Patent: Aug. 15, 2017

(54) METHOD AND APPARATUS FOR SELECTIVELY ENHANCING AN IMAGE

(71) Applicant: KPIT TECHNOLOGIES LIMITED, Pune (IN)

(72) Inventors: Vinay Govind Vaidya, Hinjawadi (IN); Sanjyot Gindi, Hinjawadi (IN)

(73) Assignee: KPIT TECHNOLOGIES LIMITED (IN)

( * ) Notice: Subject to any disclaimer, the term of this patent is extended or adjusted under 35 U.S.C. 154(b) by 0 days.

(21) Appl. No.: 14/414,003

(22) PCT Filed: Jul. 9, 2013

(86) PCT No.: PCT/IN2013/000422
§ 371 (c)(1),
(2) Date: Jan. 9, 2015

(87) PCT Pub. No.: WO2014/033732
PCT Pub. Date: Mar. 6, 2014

(65) Prior Publication Data
US 2015/0125081 A1 May 7, 2015

(30) Foreign Application Priority Data

Jul. 10, 2012 (IN) .......................... 1986/MUM/2012

(51) Int. Cl.
*G06T 5/00* (2006.01)
*G06K 9/46* (2006.01)

(52) U.S. Cl.
CPC ................. *G06T 5/00* (2013.01); *G06K 9/46* (2013.01); *G06T 5/008* (2013.01); *G06K 2009/4666* (2013.01); *G06T 2207/20012* (2013.01); *G06T 2207/30261* (2013.01)

(58) Field of Classification Search
CPC ............ G06K 2009/4666; G06K 9/46; G06K 9/00228; G06K 9/4661; G06K 9/38; G06T 2207/20012; G06T 5/00; G06T 5/008; G06T 5/40
See application file for complete search history.

(56) References Cited

U.S. PATENT DOCUMENTS

| | | | |
|---|---|---|---|
| 6,240,217 B1 * | 5/2001 | Ercan ...................... | G06K 9/38 382/105 |
| 2010/0080459 A1 * | 4/2010 | Dai ......................... | G06T 5/009 382/170 |

* cited by examiner

*Primary Examiner* — Kim Vu
*Assistant Examiner* — Michael Vanchy, Jr.
(74) *Attorney, Agent, or Firm* — Foley & Lardner LLP

(57) ABSTRACT

The present invention provides a method and apparatus for selectively enhancing regions in an image. In one embodiment, a digital image is read from an image source and is converted into a desired image model. One or more regions in the image having intensity values of pixels falling outside a pre-determined optimal intensity range are determined. The one or more regions in the image are then enhanced using a modeled light source of an optimal intensity such that the intensity value of pixels corresponding to the one or more regions in the image fall within the pre-determined optimal intensity range.

19 Claims, 10 Drawing Sheets

METHOD AND APPARATUS FOR SELECTIVELY ENHANCING AN IMAGE

CROSS-REFERENCE TO RELATED PATENT APPLICATIONS

This application is a U.S. National Stage Application that claims priority under 35 U.S.C. 371 to International Patent Application No. PCT/IN2013/000422, filed on Jul. 9, 2013, which claims the benefit of and priority to Indian Provisional Application No. 1986/MUM/2012, filed on Jul. 10, 2012, both of which are herein incorporated in their entireties.

FIELD OF THE INVENTION

The present invention generally relates to the field of image processing, and more particularly relates to a method and apparatus for selectively enhancing an image.

BACKGROUND OF THE INVENTION

With the advent of digital computing, a large number of applications such as automotive, surveillance, and bio metric use digital images and videos. Some of these applications require that images captured are of finest possible quality. One of the shortcomings in many images captured using image capturing devices is that, when a poorly lit scene is captured, details in the captured image are lost due to low light areas and/or overly bright areas in the scene. For example, when a light is switched on in a dark room, a peculiar pattern of illumination is observed. The intensity of pixels is highest around the light source and goes on reducing as one moves away from the light source. Similarly, in images, if a light source is placed at a specific location, pixels undergo a change in intensity according to a pattern. Consequently, the images captured have uneven lighting, thereby affecting quality during processing of such images.

SUMMARY OF THE INVENTION

The present invention provides a method and apparatus for selectively enhancing regions in an image. In one aspect, a method includes determining one or more regions in an image having intensity values of pixels falling outside a pre-determined optimal intensity range. The method further includes enhancing one or more regions in the image using a modeled light source of an optimal intensity such that the intensity value of pixels corresponding to the one or more regions in the image fall within the pre-determined optimal intensity range.

In another aspect, an apparatus includes a processor, and a memory coupled to the processor. The memory includes an image enhancement module stored in the form of instructions, that when executed the processor, cause the processor to perform method steps described above.

In yet another aspect, a non-transitory computer readable storage medium having executable instructions stored therein, that when executed by the processor, cause the processor to perform method steps described above.

Other features of the embodiments will be apparent from the accompanying drawings and from the detailed description that follows.

BRIEF DESCRIPTION OF THE ACCOMPANYING DRAWINGS

The drawings described herein are for illustration purposes only and are not intended to limit the scope of the present disclosure in any way.

DETAILED DESCRIPTION OF THE INVENTION

The present invention provides a method and apparatus for selectively enhancing regions in an image. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
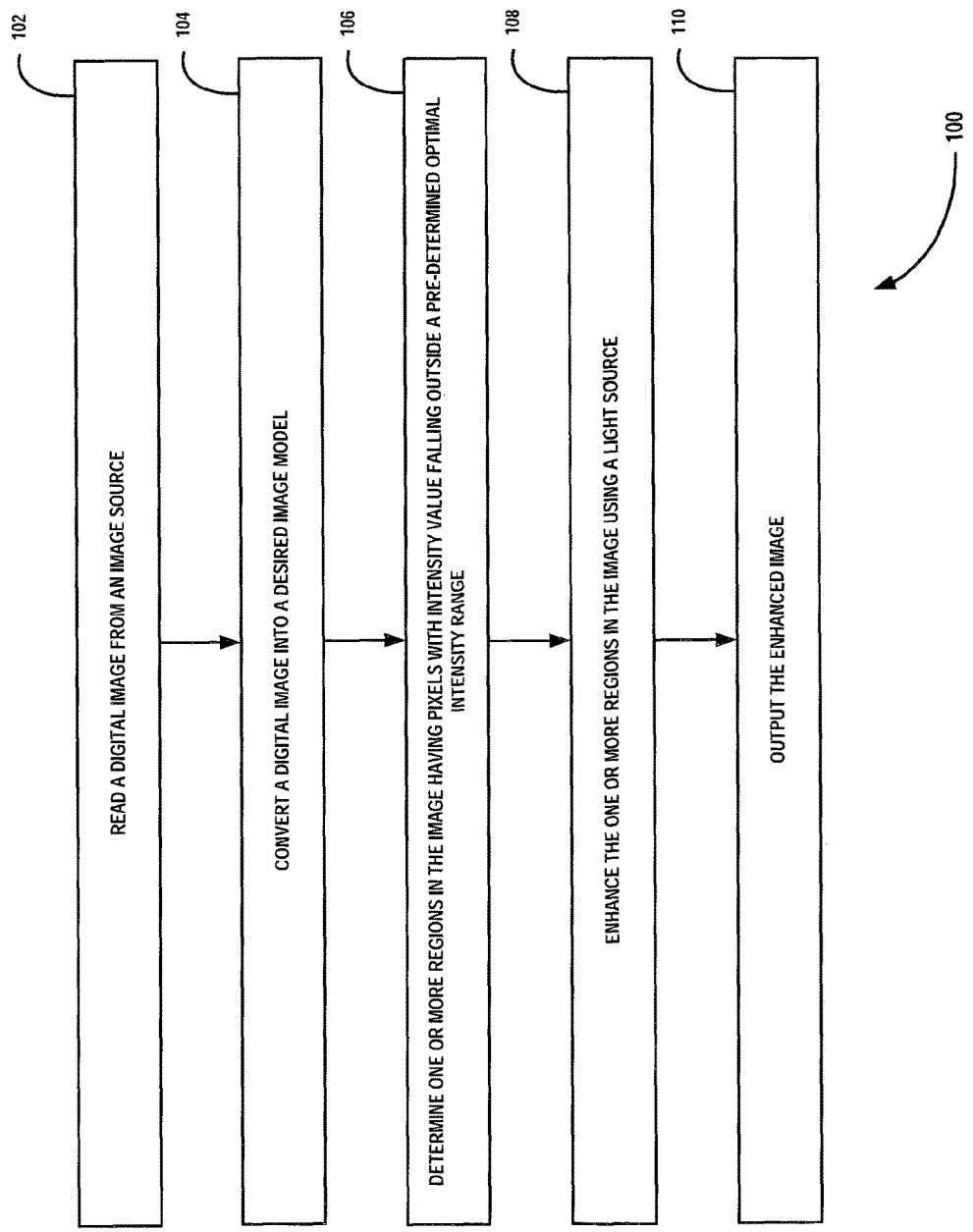
FIG. 1 is a process flowchart illustrating a method of selectively enhancing regions in an image, according to one embodiment.

FIG. 1 is a process flowchart 100 illustrating a method of enhancing regions in an image, according to one embodiment. At step 102, a digital image is read from an image source. For example, the image source may be a database storing images. Alternatively, the image source may be an image capturing unit such as a digital camera. At step 104, the digital image is converted into a desired image model. For example, the digital image is converted into an image model such as grayscale model, RGB model, HSI model, CMY model, YUV model, and YIQ model. The image model to which the image is converted depends on compatibility of processing the digital image. The light source, according to the invention, is generated based on the image model created. The type and color of the light in the image is determined based on the color of the light and the light source is modeled, accordingly. It is appreciated that the digital image is converted into the desired image model using any image conversion algorithm well known in the art. If the digital image read from the image source is in desired image model, then step 104 is skipped and the process 100 directly routed to step 106.

At step 106, one or more regions in the image having pixels with intensity value falling outside a pre-determined optimal intensity range are determined. In one embodiment, one or more regions having intensity values of pixels greater than the pre-determined optimal intensity range are determined as over bright regions in the image. In another embodiment, one or more regions having intensity values of pixels less than the pre-determined optimal intensity range are determined as dark regions. According to an example, the pre-determined optimal intensity range may be having a minimum optimal intensity value of 150 and maximum optimal intensity value of 170. Thus, for a given image, regions containing pixels with intensity value less than 150 are considered as dark regions and regions containing pixels with intensity value greater than 170 are considered as bright regions. In some embodiments, the optimal intensity range for the input image is pre-determined based on average total range of intensity values of pixels in the image and based on application for which the further processing of the image is to be performed.

Figure 3A:
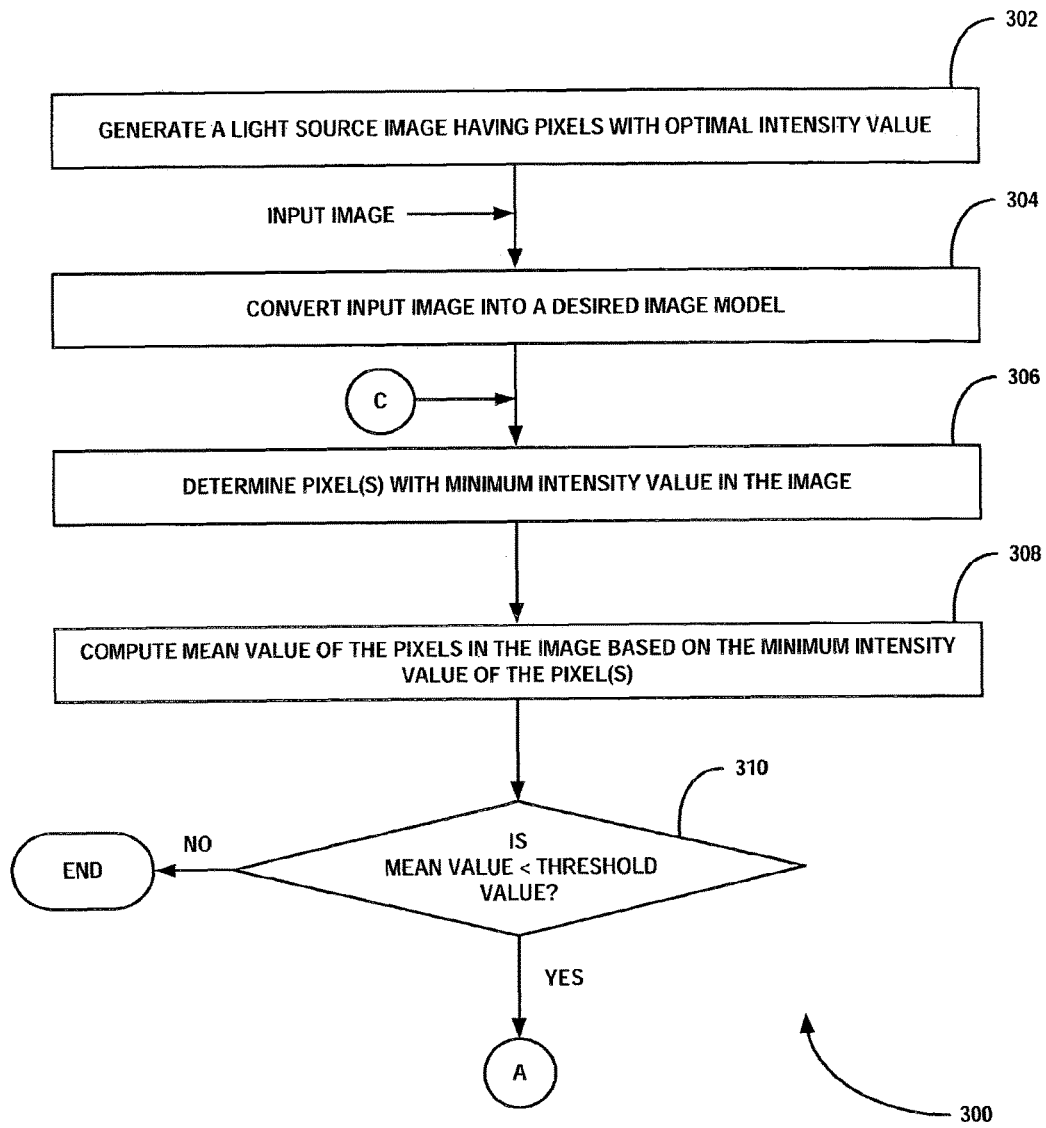
FIG. 3 is a process flowchart illustrating an exemplary method of brightening dark regions in an input image, according to one embodiment.
Figure 3B:
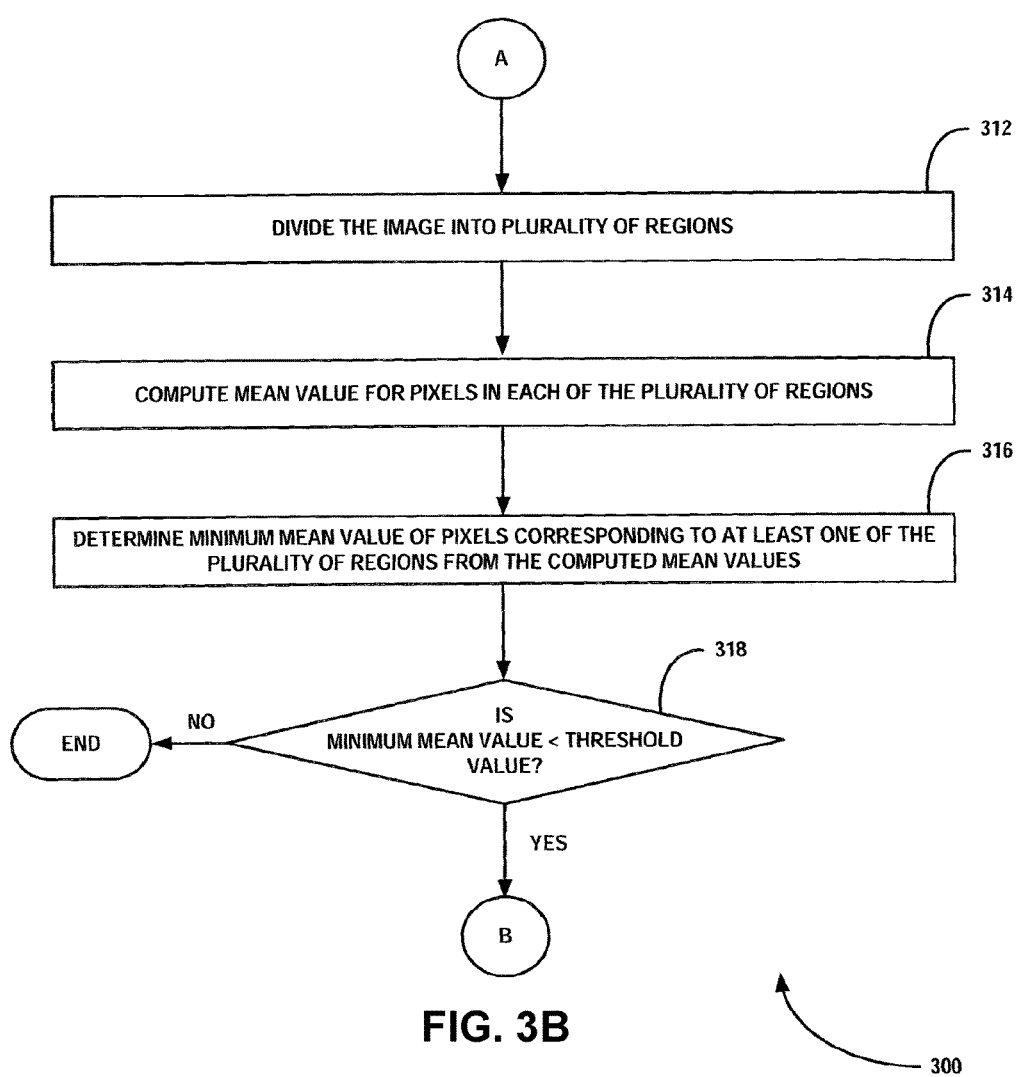
Figure 3C:
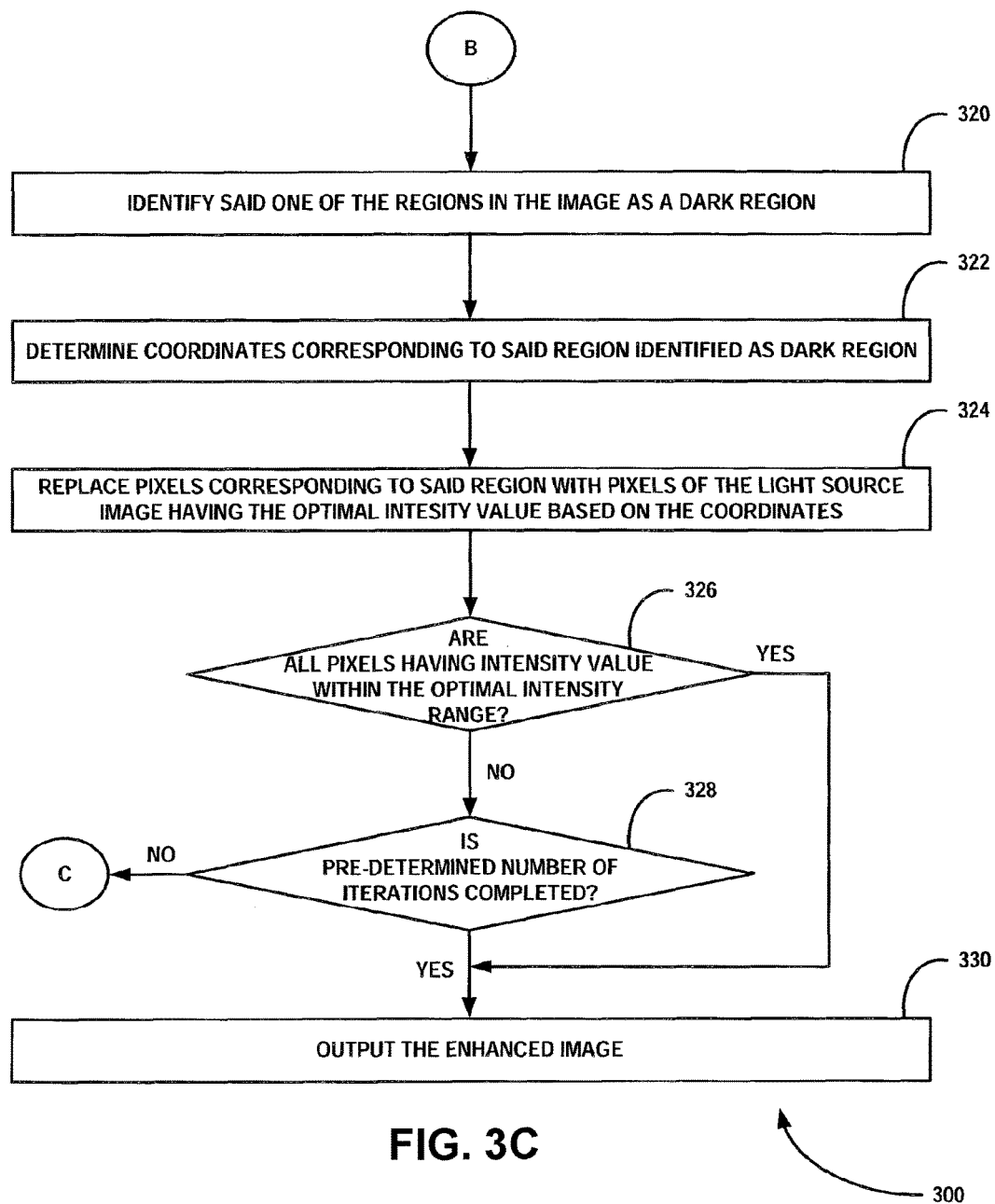
Figure 4:
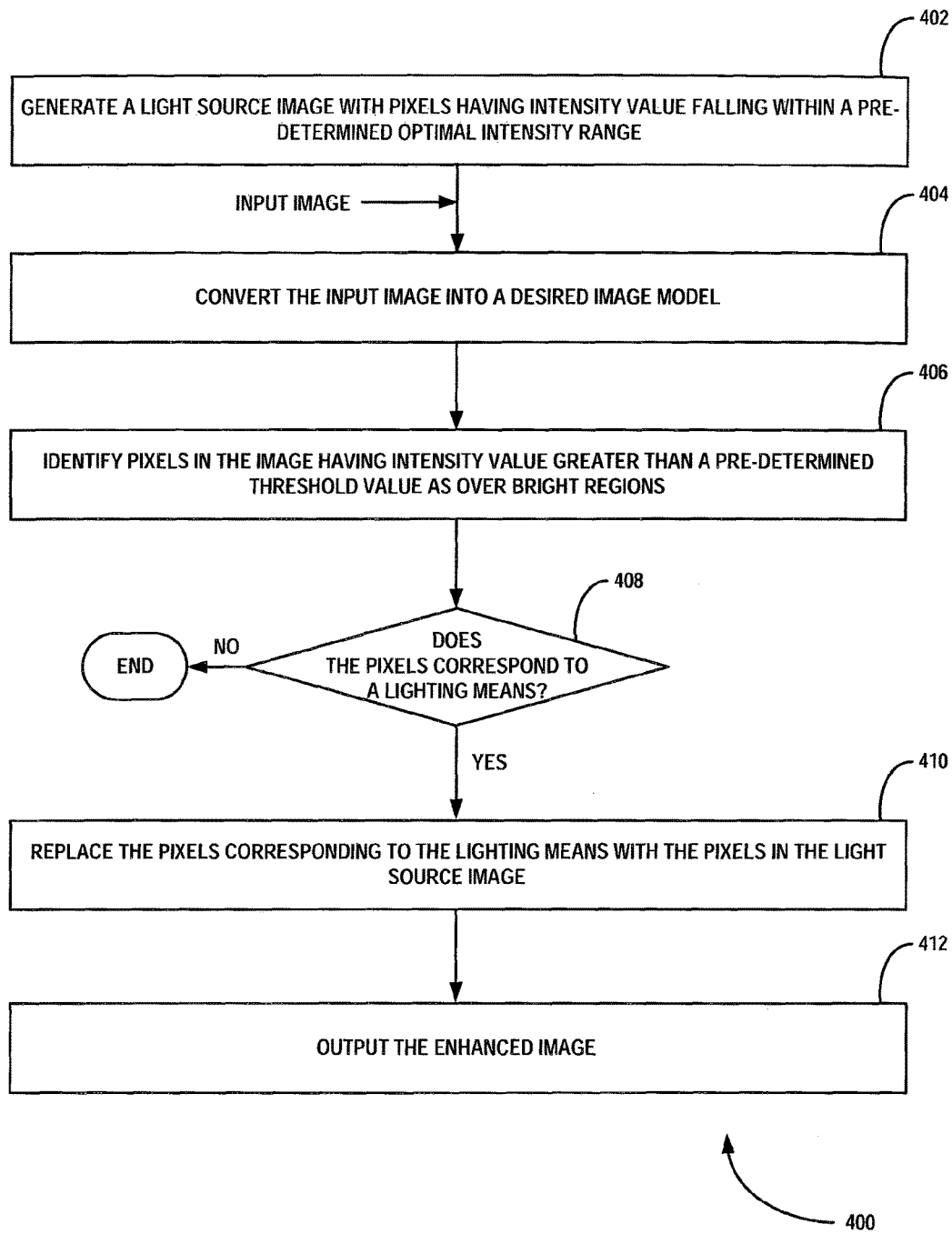
FIG. 4 is a process flowchart illustrating an exemplary method of softening over bright regions in an input image, according to one embodiment.

At step 108, the one or more regions in the image are enhanced using a modeled light source of an optimal intensity such that the intensity value of pixels corresponding to the one or more regions in the image fall within the pre-determined optimal intensity range. In one embodiment, the dark regions in the image are brightened using a light source of optimal intensity. In another embodiment, the over bright regions in the image are softened using a light source of optimal intensity. It is understood that the light sources used for softening the over bright regions and brightening the dark regions may be same light source or different light sources modeled to enhance the image. The softening effect has similar effect of dimming a light or even turning it off altogether. At step 110, the enhanced image is outputted. In one embodiment, the enhanced image is outputted in an image model associated with the image read from the image source. In another embodiment, the enhanced image is outputted in a desired image model. The method steps in identifying and enhancing dark regions and softening over bright regions in the image is illustrated in FIGS. 3 and 4.

Figure 2:
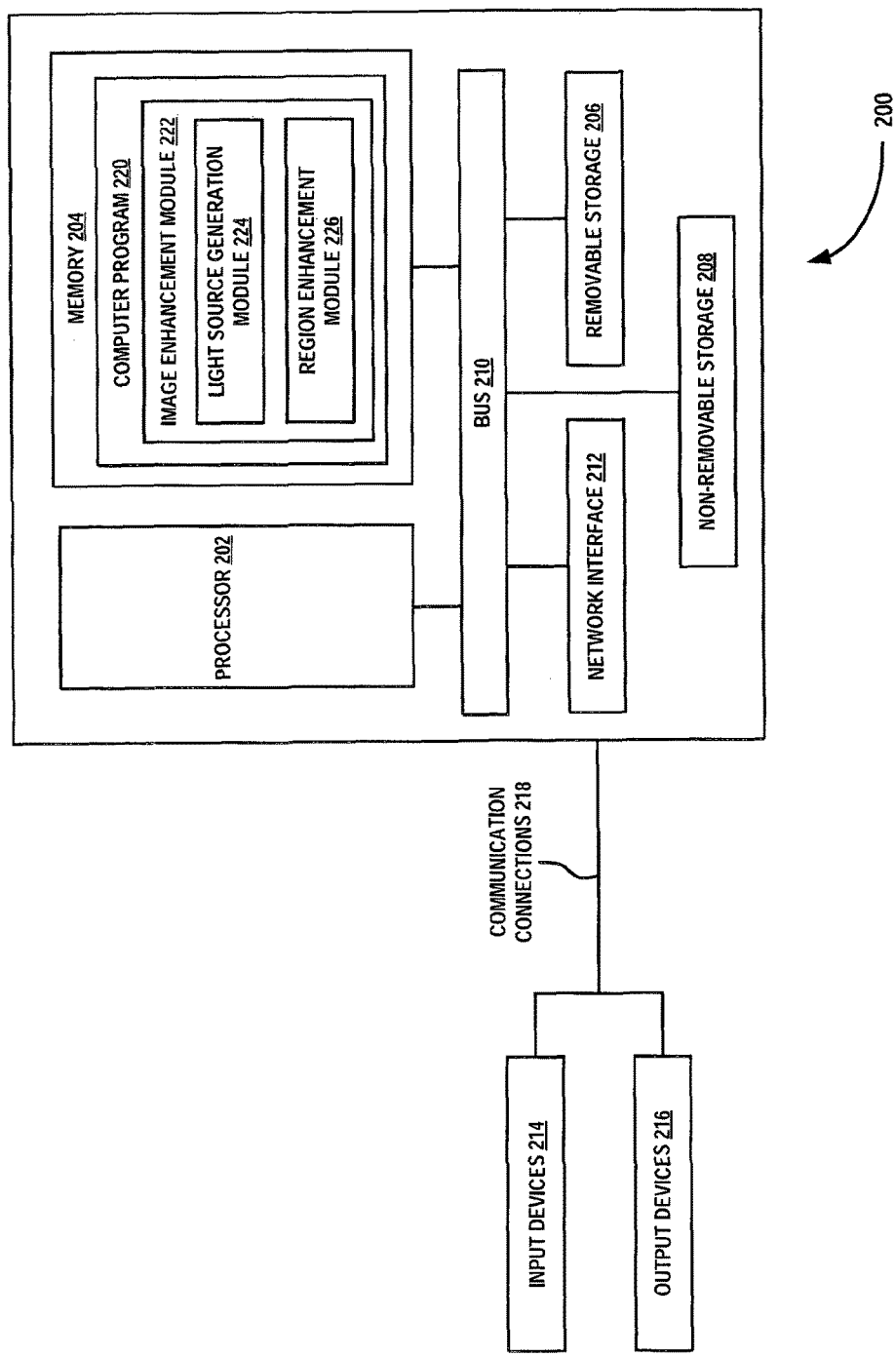
FIG. 2 shows an exemplary image processing device for implementing one or more embodiments of the present subject matter.

FIG. 2 shows an example of an image processing device 200 for implementing one or more embodiments of the present subject matter. FIG. 2 and the following discussion are intended to provide a brief, general description of the suitable computing environment in which certain embodiments of the inventive concepts contained herein may be implemented.

The image processing device 200 may include a processor 202, a memory 204, a removable storage 206, and a non-removable storage 208. The image processing device 200 additionally includes a bus 210 and a network interface 212. The image processing device 200 may include or have access to one or more user input devices 214, one or more output devices 216, and one or more communication connections 218. The one or more user input devices 214 may be keyboard, mouse, and the like. The one or more output devices 216 may be a display. The communication connections 218 may include mobile networks such as General Packet Radio Service (GPRS), Wireless Fidelity (Wi-Fi®), Worldwide Interoperability for Microwave Access (WiMax), Long Term Evolution (LTE), and the like.

The memory 204 may include volatile memory and/or non-volatile memory for storing computer program 220. A variety of computer-readable storage media may be stored in and accessed from the memory elements of the image processing device 200, the removable storage 206 and the non-removable storage 208. Computer memory elements may include any suitable memory device(s) for storing data and machine-readable instructions, such as read only memory, random access memory, erasable programmable read only memory, electrically erasable programmable read only memory, hard drive, removable media drive for handling memory cards and the like.

The processor 202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 202 may also include embedded controllers, such as generic or programmable logic devices or arrays, application specific integrated circuits, single-chip computers, smart cards, and the like.

Embodiments of the present subject matter may be implemented in conjunction with program modules, including functions, data structures, and application programs, for performing tasks, or defining abstract data types or low-level hardware contexts. Machine-readable instructions stored on any of the above-mentioned storage media may be executable by the processor 202 of the image processing device 200. For example, a computer program 220 includes an image enhancement module 222 with a light source modeling module 224 and a region enhancement module 226 stored in the form of machine readable instructions. The machine-readable instructions, which when executed by the processor 202, may cause the image processing device 200 to perform steps illustrated in FIGS. 1, 3 and 4 according to the various embodiments of the present subject matter.

For example, the light source modeling module 224 causes the processor 202 to model a light source of optimal-intensity for brightening dark regions in an image and model a light source of optimal intensity for softening over bright regions in the image. Further, the light source modeling module 224 causes the processor 202 to generate a light source image with pixels having intensity value falling within a pre-determined optimal intensity range from the respective modeled light source. The region enhancement module 226 causes the processor 202 to identify dark and over bright regions in the image and enhance the dark and over bright regions in the image using the respective light source images.

FIG. 3 is a process flowchart 300 illustrating an exemplary method of brightening dark regions in an input image, according to one embodiment. At step 302, a grayscale light source image having pixels with intensity value falling within a pre-determined optimal intensity range is generated for brightening dark regions in an input image. In some embodiments, a light source of optimal intensity is modeled for brightening dark regions in the input image. In these embodiments, the light source image is generated by rotating and merging the modeled light source. In one exemplary implementation, the light source is modeled using the following equation:

$$S(y,x)=k^*\exp(-\lambda^*(r/R)),$$

where, $$R=(S1^2+S2^2)^{0.5}$$

and $$r=((x+\textit{offx})^2)+((y+\textit{offy})^2)^{0.5},$$

where, k and λ are constants which are determined experimentally, S1 and S2 are size of light source model, x varies from 1 to S1 and y varies from 1 to S2, offx is an offset value of x and offy is offset value of y. The offx and offy are co-ordinate values in the image from where scanning of the image need to begin to identify dark region(s) in the image. In an example, as the entire image is scanned for identifying the dark region(s), the values of offx and offy are set to 0 so as to begin scanning of the image from the origin. For certain applications, the scanning for the dark region(s) not need begin at the origin (0,0) but away from the origin (0,0). In such case, the offset values offx and offy may have coordinate values corresponding to the point where scanning of the dark region(s) has started.

Figure 5A:
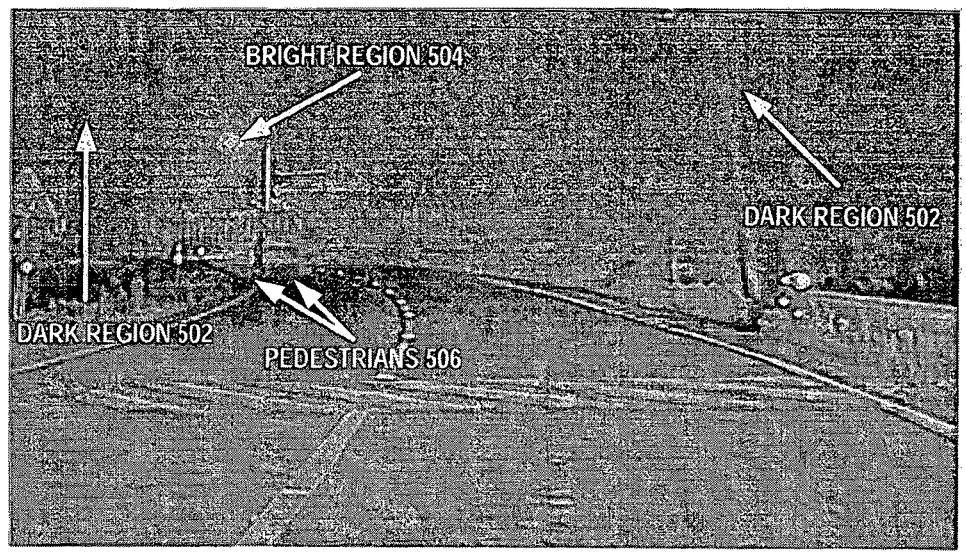
FIG. 5A is a pictorial representation depicting an exemplary input image containing dark regions and over bright regions.

At step 304, the input image (as shown in FIG. 5A) is converted into a desired image model. At step 306, a pixel(s) having minimum intensity value in the image is determined. At step 308, mean value of the pixels in the image is computed based on the minimum intensity value of the pixel(s) in the image. At step 310, it is determined whether the mean value of the pixels in the image is less than a first pre-determined threshold value. The first pre-determined threshold value corresponds to the minimum value of the pre-determined optimal intensity range. If the mean value of pixels is less than the first pre-determined threshold value, then at step 312, the image is divided into a plurality of regions. At step 314, mean value of pixels in each of the regions is computed.

At step 316, minimum mean value of pixels corresponding to at least one of the regions is determined from the mean values computed for the regions. At step 318, it is determined whether the minimum mean value of the pixels corresponding to at least one region is less than the first pre-determined threshold value. If the minimum mean value is less than threshold value, then at step 320, the at least one of the regions is identified as a dark region in the image. At step 322, coordinates corresponding to the at least one region identified as dark region are determined. At step 324, the pixels corresponding to the at least one region having intensity value less than the first pre-determined threshold value are replaced with the pixels of the light source image having optimal intensity value based on the coordinates corresponding to the at least one region such that intensity value of the replaced pixels in the at least one region fall within the pre-determined optimal intensity range. In some embodiments, the pixels corresponding to the at least one region having intensity value less than the first pre-determined threshold value are replaced with the light source image by superimposing the light source image on the at least one region, where the size of the light source image is equal to the size of the at least one region.

Figure 5B:
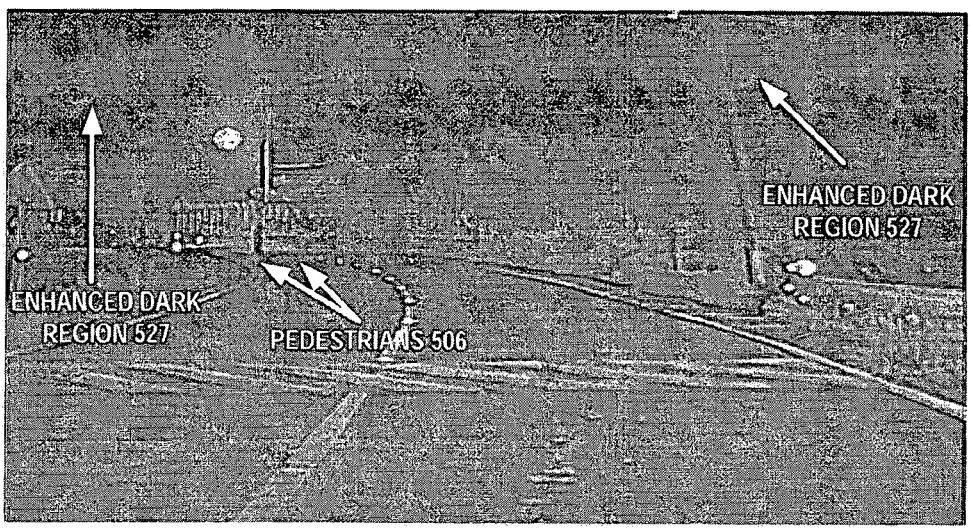
FIGS. 5B to 5D is pictorial representations depicting exemplary output images containing enhanced dark regions and/or softened bright regions.

At step 326, it is determined whether all pixels in the enhanced image are having intensity value falling within optimal intensity range. If it is determined that all the pixels in the enhanced image are having intensity value falling within optimal intensity range, then step 330 is performed. If it is determined that the pixels in the image are having intensity value falling outside the pre-determined optimal intensity range, then at step 328, it is determined whether a pre-determined number of iterations for enhancing the image are completed. If the pre-determined number of iterations is not completed, then the steps 306 to 326 repeated till all the dark regions in the image are enhanced. If the predetermined number of iterations is performed, then step 330 is performed. At the step 330, the enhanced image is outputted on the output device 216. An exemplary enhanced digital image is illustrated in FIG. 5B.

FIG. 4 is a process flowchart 400 illustrating an exemplary method for softening over bright regions in an input image, according to one embodiment. At step 402, a grayscale light source image with pixels having intensity value falling within a pre-determined optimal intensity range is generated for softening over bright regions in an input image. In some embodiments, a light source of optimal intensity is modeled for softening over bright regions in the input image. In these embodiments, the light source image is generated by rotating and merging the modeled light source. In one exemplary implementation, the light source is modeled using the following equation:

$$S(y,x)=k^*\exp(-\lambda^*(r/R)),$$

where, $R=(S1^2+S2^2)^{0.44}$, $r=((x+\text{offx})^2)+((y+\text{offy})^2)^{0.7}$, k and $\lambda$ are constants which are determined experimentally, S1 and S2 are size of light source model, x varies from 1 to S1 and y varies from 1 to S2, offx is an offset value of x and offy is offset value of y. The offx and offy are co-ordinate values in the image from where scanning of the image need to begin to identify over bright region(s) in the image. In an example, as the entire image is scanned for identifying over-bright region(s), the values of offx and offy are set to 0 so as to begin scanning of the image from the origin. For certain applications, the scanning for the over bright region(s) not need begin at the origin (0,0) but away from the origin (0,0). In such case, the offset values offx and offy may have coordinate values corresponding to the point where scanning of the over bright region(s) has started.

At step 404, the input image (as shown in FIG. 5A) is converted into a desired image model. At step 406, pixels in the image with intensity value greater than a second pre-determined threshold value are identified as over bright regions. The second pre-determined threshold value is the maximum value of the pre-determined optimal intensity range. At step 408, it is determined whether the identified pixels correspond to at least one lighting means (e.g., street light, a head light, camera flash, etc.) in a scene captured in the image based on size and shape of the determined pixels. Usually, the shape of emission of light from any lighting means is circular. So, if the identified pixels are of circular shape, then the identified pixels may be considered as corresponding to a lighting means. Further, based on the size of the identified pixels corresponding to the lighting means, it can be determined whether the lighting means is located at a far off distance or close by with respect to an image capturing device. Thus, depending on the shape and size of the determined pixels, a decision is made as whether to treat the determined pixels as corresponding to a lighting means that has resulted in over bright regions and whether to soften the over bright regions or not as described below.

Figure 5C:
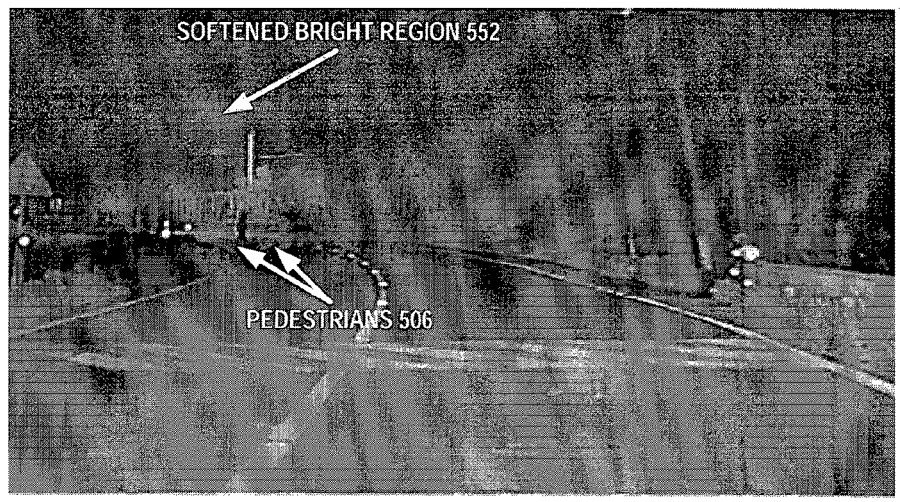

If the pixels correspond to the lighting means, then at step 410, the pixels corresponding to the lighting means are replaced with the pixels of the light source image such that intensity value of the replaced pixels fall within the pre-determined optimal intensity range. In some embodiments, the pixels corresponding to the lighting means are replaced with the pixels of the light source image by superimposing the light source image onto one or more regions encompassing the pixels which correspond to the lighting means, where the size of the light source image may be equal to the size of the over bright regions. At the step 412, the enhanced image is outputted on the output device 216. An exemplary enhanced digital image is shown in FIG. 5C. It is understood that, the process 300 of brightening dark regions and the process 400 of softening over bright regions in the image can be performed simultaneously or separately.

FIG. 5A is a pictorial representation depicting an exemplary input image 500 containing dark regions 602 and over bright region 604. The pictorial representation in FIG. 5A depicts an input image 500 having dark regions 502 and over bright region 504. It can be seen that a pedestrians 506 are not clearly visible due to presence of dark regions 502 and over bright region 504 in the input image 500. According to the present disclosure, the image processing device 200 scans the input image 500 and identifies the dark regions 502 and over bright region 504 having intensity value of pixels falling outside a desired optimal intensity range using the region enhancement module 226.

Figure 5D:

Also, the image processing device 200 generates a light source image by modeling a light source with pixels of optimal intensity value desired for further processing the image 500 using the light source modeling module 224. For example, the image processing device 200 generates a light source image for brightening the dark regions 502 in the image 500 and another light source image for softening the over bright region 504 in the input image 500. Thereafter, the image processing device 500 generates an output image with the enhanced dark region 527 and softened over bright region 552 by superimposing the respective light source image on the dark region 502 and the over bright region 504 using the region enhancement module 226. FIG. 5B is a pictorial representation depicting an exemplary output image 525 containing enhanced dark regions 527. FIG. 5C is a pictorial representation depicting an exemplary output image 550 containing softened over bright region 552. FIG. 5D is a pictorial representation depicting an exemplary output image 575 containing enhanced dark regions 527 and softened over bright region 552. It can be seen that now, after modeling of the light source in dark regions and softening the over-bright regions in the image, the pedestrians 506 are clearly visible in the output images 525, 550 and 575, which were not clearly visible in the input image 500.

Figure 6A:
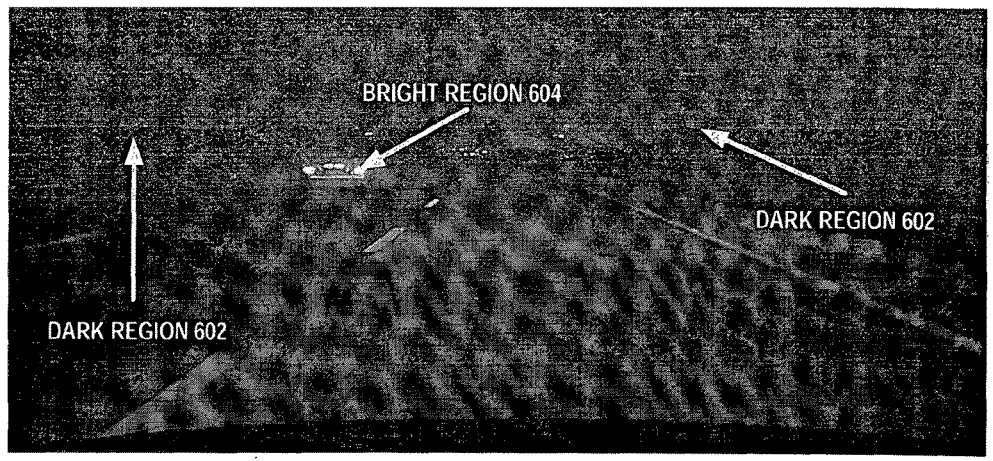
FIG. 6A is a pictorial representation depicting another exemplary input image containing dark regions and over bright regions.
Figure 6B:
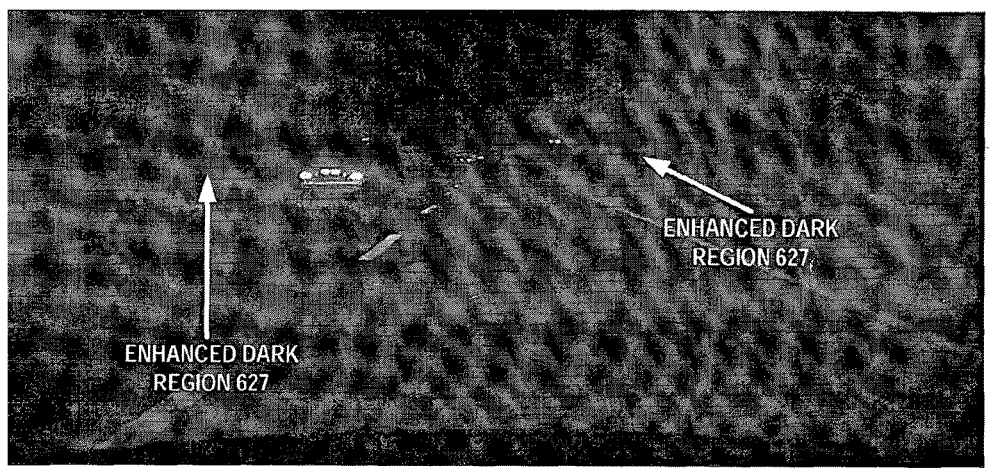
FIGS. 6B and 6D are pictorial representations depicting another exemplary output images containing enhanced dark regions and/or softened over bright regions respectively.
Figure 6C:
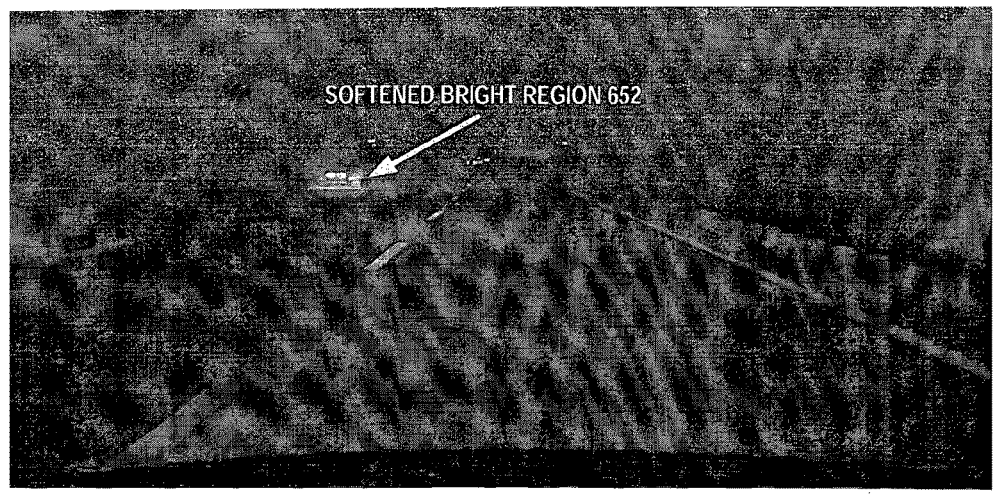
Figure 6D:
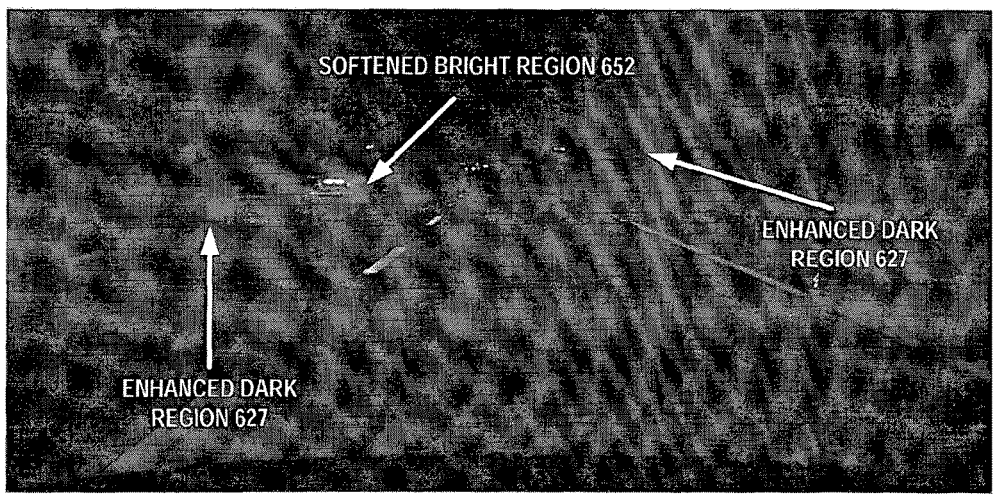

FIG. 6A is a pictorial representation depicting another exemplary input image 600 containing dark regions 602 and over bright region 604. FIG. 6B is a pictorial representation depicting an exemplary output image 625 containing enhanced dark regions 627. FIG. 6C is a pictorial representation depicting an exemplary output image 650 containing softened over bright region 652. FIG. 6D is a pictorial representation depicting an exemplary output image 675 containing enhanced dark regions 627 and softened over bright region 652.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit. The values provided are to be considered in an exemplary manner only and it is to be understood that they could vary based on the requirements and the applications.

We claim:

1. A method of selectively enhancing regions in an image, comprising:
   determining one or more bright regions in the image and one or more dark regions in the image, wherein the bright regions and the dark regions include pixels with an intensity value falling outside a desired intensity range, and wherein determining the one or more bright regions in the image having pixels with an intensity value falling outside the desired intensity range comprises:
      determining pixels in the image with intensity values greater than a threshold value; and
      determining whether the determined pixels correspond to a first light source in the image based on a size and a shape of one or more regions encompassing the determined pixels; and
   enhancing the one or more dark regions and the one or more bright regions in the image using a light source image having pixels with a desired intensity value, wherein enhancing the one or more dark regions and the one or more bright regions in the image using the light source image having pixels with the desired intensity value comprises replacing the pixels in at least one dark region and at least one bright region of the image with the pixels of the light source image by superimposing the light source image onto the at least one dark region and the at least one bright region in the image.

2. The method of claim 1, further comprising generating the light source image for brightening one or more dark regions in the image.

3. The method of claim 2, wherein generating the light source image for brightening the dark regions in the image comprises:
   modeling a light source of the desired intensity value for brightening the dark regions in the image; and
   generating the light source image using the modeled light source.

4. The method of claim 3, wherein determining the one or more dark regions in the image having pixels with the intensity value falling outside the desired intensity range comprises:
   (a) determining at least one pixel having a lowest intensity value from the pixels in the image;
   (b) computing a first mean value of the pixels in the image based on the lowest intensity value of the at least one pixel;
   (c) determining whether the first mean value of the pixels in the image is less than a threshold value;
   after the steps (a) to (c), and in response to determining the first mean value of the pixels in the image is less than the threshold value, performing the following steps:
   (d) dividing the image into a plurality of regions;
   (e) computing a second mean value of pixels in each of the plurality of regions;
   (f) determining a minimum mean value of pixels corresponding to at least one of the plurality of regions from the second mean values of the plurality of regions;
   (g) determining whether the minimum mean value of the pixels corresponding to said at least one of the plurality of regions is less than the threshold value;
   (h) identifying said at least one of the plurality of regions in the image as the dark region if the minimum mean value of the pixels corresponding to said at least one of the plurality of regions is less than the threshold value, wherein enhancing the one or more regions in the image comprises enhancing the identified dark region; and
   (i) repeating the steps (a) to (h) until all the dark regions in the image are enhanced.

5. The method of claim 1, further comprising generating the light source image for softening bright regions in the image.

6. The method of claim 5, wherein generating the light source image for softening the bright regions in the image comprises:
modeling a light source for softening one or more bright regions in the image; and
generating the light source image using the modeled light source.

7. The method of claim 1, further comprising converting the image in a desired image model.

8. The method of claim 7, wherein the desired image model is selected from the group consisting of a grayscale image model, an RGB image model, a HSI image model, a CMY image model, a YIQ image model, and a YUV image model.

9. An apparatus comprising:
a processor; and
a memory coupled to the processor, wherein the memory comprises an image enhancement module stored in the form of instructions that, when executed the processor, cause the processor to:
determine one or more bright regions in an image, and one or more dark regions in the image, wherein the bright regions and the dark regions include pixels with an intensity value falling outside a desired intensity range, and wherein determining the one or more bright regions in the image having pixels with an intensity value falling outside the desired intensity range comprises:
determining pixels in the image with intensity values greater than a threshold value; and
determining whether the determined pixels correspond to a first light source in the image based on a size and a shape of one or more regions encompassing the determined pixels; and
enhance the one or more dark regions and the one or more bright regions in the image using a light source image having pixels with a desired intensity value, wherein in enhancing the one or more dark regions and the one or more bright regions in the image using the light source image having pixels with the desired intensity value, the image enhancement module causes the processor to replace the pixels in at least one dark region and at least one bright region of the image with the pixels of the light source image, by superimposing the light source image onto the at least one dark region and the at least one bright region in the image.

10. The apparatus of claim 9, wherein the image enhancement module causes the processor to generate the light source image for brightening one or more dark regions in the image.

11. The apparatus of claim 10, wherein in determining the one or more dark regions in the image having pixels with intensity value falling outside the desired intensity range, the image enhancement module causes the processor to:
(a) determine at least one pixel having a lowest intensity value from the pixels in the image;
(b) compute a first mean value of the pixels in the image based on the lowest intensity value of the at least one pixel;
(c) determine whether the first mean value of the pixels in the image is less than a threshold value;
after the steps (a) to (c), and in response to determining the first mean value of the pixels in the image is less than the threshold value, perform the following steps:
(d) divide the image into a plurality of regions;
(e) compute a second mean value of pixels in each of the plurality of regions;
(f) determine a minimum mean value of pixels corresponding to at least one of the plurality of regions from the second mean values of the plurality of regions;
(g) determine whether the minimum mean value of the pixels corresponding to said at least one of the plurality of regions is less than the threshold value;
(h) identify said at least one of the plurality of regions in the image as the dark region if the minimum mean value of the pixels corresponding to said at least one of the plurality of regions is less than the threshold value, wherein the processor is configured to enhance the one or more regions in the image by enhancing the identified dark region; and
(i) repeat the steps (a) to (h) until all the dark regions in the image are enhanced.

12. The apparatus of claim 9, wherein the image enhancement module cause the processor to generate the light source image for softening bright regions in the image.

13. The apparatus of claim 9, wherein the image enhancement module cause the processor to convert the image in a desired image model.

14. The apparatus of claim 13, wherein the desired image model is selected from the group consisting of a grayscale image model, an RGB image model, a HSI image model, a CMY image model, a YIQ image model, and a YUV image model.

15. A non-transitory computer readable storage medium having executable instructions stored therein, that when executed by the processor, cause the processor to perform operations comprising:
determining one or more bright regions in an image and one or more dark regions in the image, wherein the bright regions and the dark regions include pixels with an intensity value falling outside a desired intensity range, wherein determining the one or more bright regions in the image having pixels with an intensity value falling outside the desired intensity range comprises:
determining pixels in the image with intensity values greater than a threshold value; and
determining whether the determined pixels correspond to a first light source in the image based on a size and a shape of one or more regions encompassing the determined pixels; and
enhancing the one or more dark regions and the one or more bright regions in the image using a light source image having pixels with a desired intensity value, wherein in enhancing the one or more dark regions and the one or more bright regions in the image using the light source image having pixels with the desired intensity value, the operations further comprise replacing the pixels in at least one dark region and at least one bright region of the image with the pixels of the light source image by superimposing the light source image onto the at least one dark region and the at least one bright region in the image.

16. The storage medium of claim 15, wherein the operations further comprise generating the light source image for brightening one or more dark regions in the image.

17. The storage medium of claim 16, wherein in determining the one or more dark regions in the image having pixels with intensity value falling outside the desired intensity range, the operations further comprise:

(a) determining at least one pixel having a lowest intensity value from the pixels in the image;
(b) computing a first mean value of the pixels in the image based on the lowest intensity value of the at least one pixel;
(c) determining whether the first mean value of the pixels in the image is less than a first threshold value;
after the steps (a) to (c), and in response to determining the first mean value of the pixels in the image is less than the threshold value, performing the following steps:
(d) dividing the image into a plurality of regions;
(e) computing a second mean value of pixels in each of the plurality of regions;
(f) determining a minimum mean value of pixels corresponding to at least one of the plurality of regions from the second mean values of the plurality of regions;
(g) determining whether the minimum mean value of the pixels corresponding to said at least one of the plurality of regions is less than the first threshold value;
(h) identifying said at least one of the plurality of regions in the image as the dark region if the minimum mean value of the pixels corresponding to said at least one of the plurality of regions is less than the first threshold value, wherein enhancing the one or more regions in the image comprises enhancing the identified dark region; and
(i) repeating the steps (a) to (h) until all the dark regions in the image are enhanced.

18. The storage medium of claim 15, wherein the operations further comprise generating the light source image for softening bright regions in the image.

19. A method of selectively enhancing regions in an image, comprising:
determining one or more regions in the image having pixels with an intensity value falling outside a desired intensity range; and
enhancing the one or more regions in the image using a light source image having pixels with a desired intensity value;
generating the light source image for brightening one or more dark regions in the image, wherein generating the light source image comprises:
modeling a light source of the desired intensity value for brightening the dark regions in the image; and
generating the light source image using the modeled light source;
wherein determining the one or more regions in the image having pixels with the intensity value falling outside the desired intensity range comprises:
(a) determining at least one pixel having a lowest intensity value from the pixels in the image;
(b) computing a first mean value of the pixels in the image based on the lowest intensity value of the at least one pixel;
(c) determining whether the first mean value of the pixels in the image is less than a threshold value;
after the steps (a) to (c), and in response to determining the first mean value of the pixels in the image is less than the threshold value, performing the following steps:
(d) dividing the image into a plurality of regions;
(e) computing a second mean value of pixels in each of the plurality of regions;
(f) determining a minimum mean value of pixels corresponding to at least one of the plurality of regions from the second mean values of the plurality of regions;
(g) determining whether the minimum mean value of the pixels corresponding to said at least one of the plurality of regions is less than the threshold value;
(h) identifying said at least one of the plurality of regions in the image as a dark region if the minimum mean value of the pixels corresponding to said at least one of the plurality of regions is less than the threshold value, wherein enhancing the one or more regions in the image comprises enhancing the identified dark region; and
(i) repeating steps (a) to (h) until all the dark regions in the image are enhanced.

* * * * *